UNITED STATES PATENT OFFICE.

JAMES W. LYNCH, OF ALEXANDRIA, INDIANA, ASSIGNOR TO LYNCH GLASS MACHINERY COMPANY, OF ANDERSON, INDIANA, A CORPORATION OF INDIANA.

WARE STEADIER FOR GLASSWORKING MACHINES.

1,406,400. Specification of Letters Patent. Patented Feb. 14, 1922.

Application filed March 5, 1920. Serial No. 363,468.

*To all whom it may concern:*

Be it known that I, JAMES W. LYNCH, a citizen of the United States, and a resident of Alexandria, in the county of Madison and State of Indiana, have invented an Improvement in Ware Steadiers for Glassworking Machines, of which the following description, in connection with the accompanying drawings, is a specification, like characters on the drawings representing like parts.

This invention relates to automatic and semi-automatic glassworking machines, particularly jar and bottle pressing and blowing machines, wherein partly formed or finished bottles are produced in a series of travelling molds.

The objects of the invention are to prevent the article being formed from being pulled or thrown to either side or out of its proper position on the mold bottom upon opening the mold, and to steady the article in place in the open mold prior to its being removed or transferred to another part of the machine, without distorting the shape of the article.

The invention is illustrated in the accompanying drawings as applied to a glass blowing machines having a series of molds for forming wide mouthed jars or bottles supported on a rotary table; but the invention is not restricted to a machine of the rotary type. What the invention consists in is defined in the appended claims, reference to the accompanying drawings and description being made by way of illustration only as showing and describing a preferred mode of carrying out the invention.

Figure 1:
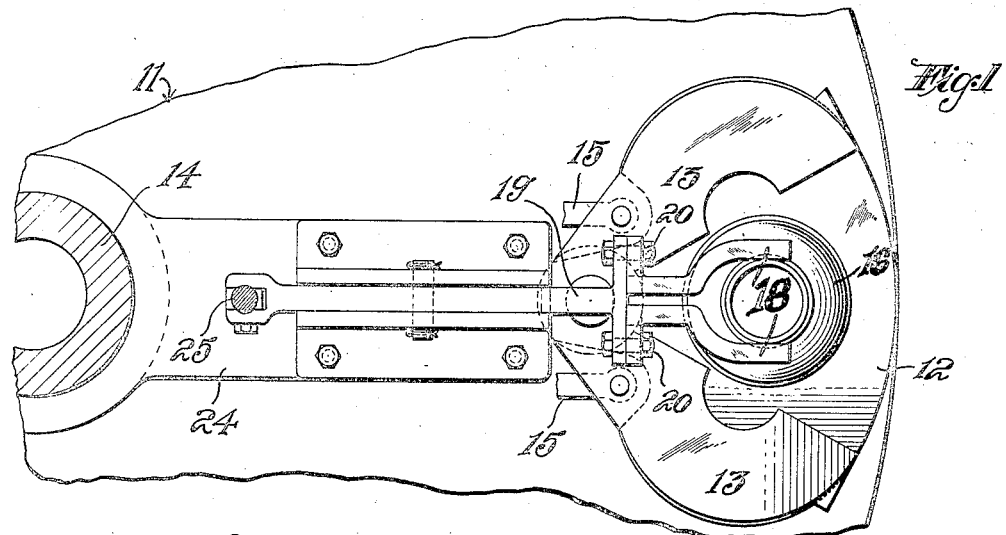
Figure 2:
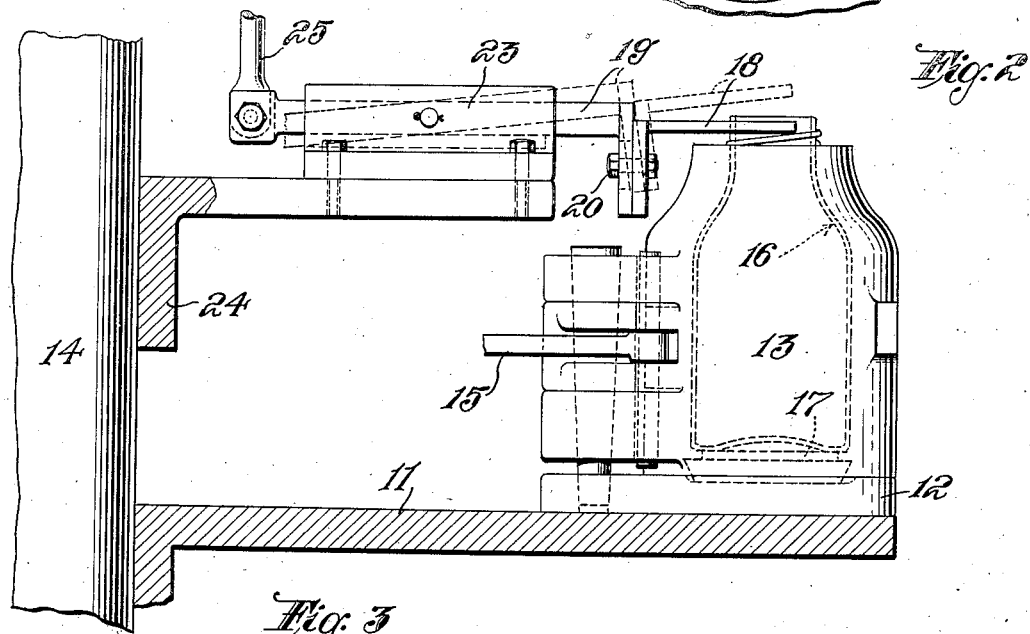
Figure 3:
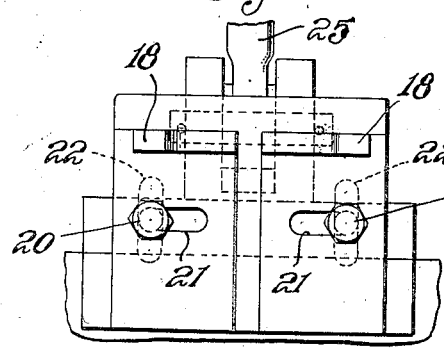

In the drawings, Fig. 1 is a top view of a portion of a rotary table carrying the molds, one mold being shown open with a jar in position therein between the fingers of the steadying device;

Fig. 2 is a side elevation of the same with the mold in closed position, the table and mold support being shown partly in cross-section; and Fig. 3 is a front view of the steadying device, showing the manner of adjusting the fingers to accomodate bottles of different sizes.

In the apparatus shown in the drawings, the table 11, upon which the mold supports 12 and two part molds 13 are mounted, is rotatably supported upon the center column 14 and is caused to turn intermittently to bring the successive molds into position for discharging their contents, as shown in Fig. 1. The mold sections are spread apart to open the successive molds as they arrive in discharging position by the links 15, which are operated by suitable cams, pneumatic cylinders or other devices such as have heretofore been used in machines of this type. When the mold is opened, the glass jar or other article 16 is left standing on the middle of the mold bottom 17.

Fingers 18 are provided in order to steady the article 16 and hold it from being pulled or thrown to either side or out of the mold by the movement of the mold sections or by jarring incident to the operation of the machine. These fingers are spaced equally distant from or arranged concentric with the axis of the mold to swing up and down, and are moved just prior to the opening of the mold into position one on each side of the portion of the neck of the article which projects above the top of the mold.

The fingers are adjustably secured to an angle plate 19 by screws 20 passing through horizontal slots 21 in the base portions of the fingers, and through vertical slots 22 in the adjacent legs of the angle plate. The angle plate is pivoted to a support 23 carried by a bracket 24 which may be adjusted up and down and angularly on the column 14. The angle plate is tilted, at the proper times, to lower the fingers into place around the neck of a jar and to raise them to avoid interference with the approach of the next succeeding jar, by means of a link 25 which is operated by a cam, pneumatic cylinder, or other means working in synchronism with the stopping and starting of the table 11.

The steadying fingers should be adjusted so as just not to touch the articles in the molds so long as they remain in central position on the mold bottoms. The bracket 24 may be either fixed in one angular position on the column, or movable around the column with the table, depending upon whether the molds are arranged to open after they reach the discharging position or as they approach it. In the latter case a bracket and steadying device is required for each mold.

It is evident that changes in the shape and arrangement and direction of movement of the various parts of the device may be made to suit different types of machines and sizes and styles of articles being made.

I claim the following as my invention:

1. A ware steadying device for glassworking machines having movable mold sections, comprising a limiting stop concentric with the mold and adapted to engage the side of the article below the top before the mold sections are opened to restrain it from displacement.

2. A ware steadying device for glassworking machines having movable mold sections, comprising a limiting stop concentric with the mold and adapted to engage the side of the article below the top before the mold sections are opened to restrain it from displacement, said stop being movable into proximity with the article while the latter is held in the mold.

3. A ware steadying device for glassworking machines having movable mold sections, comprising a limiting stop concentric with the mold and adapted to engage the side of the article below the top before the mold sections are opened to restrain it from displacement, said stop being movable axially with respect to the mold to avoid conflict with the article as it approaches the discharging position.

4. A ware steadying device for glassworking machines having movable mold sections, comprising a limiting stop having an operative position in which it is spaced from and adapted to engage the side of the article below the top, and means for moving said stop in synchronism with the movement of said mold sections into said operative position before the mold sections are opened to prevent displacement of said article when released from said mold sections.

5. A ware steadying device for glassworking machines comprising a movable bottom support for the ware, guide members adapted to span without touching the ware near its top, said guide members being adjustably mounted upon a carrier, and means for moving said carrier in synchronism with said bottom support for periodically bringing into proximity and separating said guide members and said ware.

6. A ware steadying device for glassworking machines comprising a rotatable bottom support for the ware, guide members adapted to span without touching the ware near its top, said guide members being adjustably mounted upon a carrier, a support for said carrier, said support being adjustable about the axis of rotation of said bottom support, and means for moving said carrier in synchronism with said bottom support for periodically bringing into proximity, and separating said guide members and said ware.

7. A device for preventing glass articles from being forced to either side of a mold having separable sections as the mold opens, said device including a movable stop having a working position in which it is about but spaced from the upper portion of the article before the mold opens.

8. A device for preventing glass articles from being forced to either side of a mold having separable sections as the mold opens, said device including a movable stop having adjustable fingers adapted to embrace an article centrally positioned in said mold, and means for periodically moving said stop into a working position in which said fingers are about but spaced from the upper portion of the article before the mold opens.

In testimony whereof, I have signed my name to this specification.

JAMES W. LYNCH.